3,122,410
PROCESS FOR THE DYEING, PADDING AND PRINTING OF POLYESTER FIBERS
Curt Mueller, Basel, and Urs Lerch, Neu-Allschwil, Switzerland, assignors to Sandoz Ltd., Basel, Switzerland
No Drawing. Filed June 23, 1960, Ser. No. 38,103
Claims priority, application Switzerland July 1, 1959
6 Claims. (Cl. 8—41)

It has been found that dyestuffs of the formula

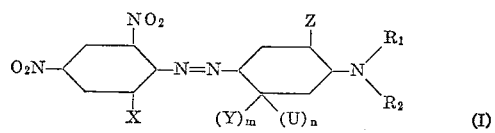

wherein

X denotes hydrogen, chlorine, bromine, cyano, trifluoromethyl or nitro,
Y hydrogen, chlorine, bromine, low molecular alkyl or acylamino,
U hydrogen, chlorine, bromine or low molecular alkyl,
Z hydrogen or low molecular alkoxy,
$R_1$ low molecular alkyl, low molecular alkoxyalkyl or low molecular acyloxyalkyl and
$R_2$ low molecular acyloxyalkyl when $n$ is 0 and $m$ is 1, or low molecular cyanoalkyl or low molecular acyloxyalkyl when $m$ is 0 and $n$ is 1,
$m$ the number 0 or 1
and
$n$ the number 0 or 1, are highly suitable for the dyeing, padding and printing of polyester fibers. They give red, violet or blue shades which possess very good fastness properties, in particular fastness to light, washing, perspiration, sea water, gas fumes, sublimation, pleating, steaming and pressing. It is surprising that light-fast dyeings should be obtained in this way, for monoazo dyestuffs from 1-diazo-2-nitrobenzenes and tertiary couplable amines have not proved successful for dyeing cellulose acetate because of their insufficient fastness to light. The blue dyestuffs of this series are particularly suitable as main elements for navy blue and black combinations.

The dyestuffs of the invention reserve wool, cotton and viscose in blended fabrics. This property has become of great importance owing to the wide variety of blended fabrics now produced, especially those composed of a polyester fiber and wool. When blended fabrics of this type are dyed with disperse dyestuffs the wool is stained to a considerable depth and as the stain is not fast the goods lose in value. There are no commercially available bluish red, violet and blue disperse dyestuffs which give a sufficiently good reserve of wool.

Up to the present no blue azo dyestuffs have been known which can be used for dyeing polyester fibers. The dyestuffs of this invention thus unexpectedly fulfill a technical purpose and moreover are inexpensive and dischargeable. They are particularly valuable for combination with small amounts of suitable red components for the production of inexpensive navy shades of good fastness to light, washing, perspiration, chlorine, sublimation, pleating and heat setting, and with suitable red and yellow components for blacks of similarly good fastness. The blue disperse dyestuffs of the anthraquinoid series which are employed are not dischargeable and hence give a poorer reserve of wool. The anthraquinoid dyestuffs used possess good building-up properties but are not sufficiently fast to sublimation, pleating and heat-setting, while those which are superior in these properties possess poor building-up properties and are therefore uneconomical for navy blue and black mixtures. In fact, all the mixtures that have yet been marketed are insufficiently fast to sublimation, pleating and heat-setting, and comparatively expensive.

A further object of this invention is a process for the production of stable dyeing preparations, which is characterized by mixing 55 to 95 parts of one or more dyestuffs of the general formula

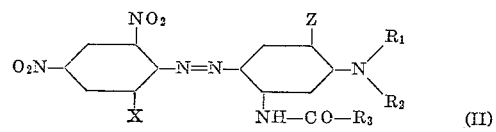

wherein

X represents hydrogen, chlorine, bromine, cyano, trifluoromethyl or nitro,
Z hydrogen or low molecular alkoxy,
$R_1$ low molecular alkyl, low molecular alkoxyalkyl or low molecular acyloxyalkyl,
$R_2$ low molecular acyloxyalkyl, and
$R_3$ low molecular alkyl, and 45 to 5 parts of one or more dyestuffs of the general formula

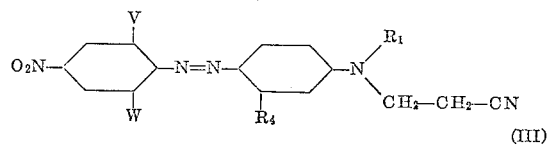

wherein

V represents hydrogen, chlorine or bromine,
W chlorine, bromine, cyano or trifluoromethyl, and
$R_4$ hydrogen, methyl, ethyl or chlorine, and
$R_1$ possesses the aforecited meaning, with one or more of the anionic dispersing agents or standardizing agents commonly used in disperse dyestuffs.

The invention further comprehends a process for the dyeing, padding and printing of polyester fibers with disperse dyestuffs, which is characterized by the use for this purpose, either simultaneously or successively in any order, of 55 to 95 parts of one or more dyestuffs of the general Formula II and 45 to 5 parts of one or more dyestuffs of the general Formula III.

In this way it is possible for the first time to dye polyester fibers inexpensively in navy blue shades and blacks which possess good fastness to light, perspiration, washing, sublimation, pleating and heat-setting.

The term polyester fibers is used here to cover the condensation products of terephthalic acid and ethylene glycol marketed under the registered trademarks "Terylene," "Dacron," "Dralon," "Tergal," "Terital," "Trevira" and "Diolen," and similar fibers such as "Kodel" which is stated to be a condensation product of terephthalic acid and 1,4-bis-(hydroxymethyl)-hexahydrobenzene.

The dyestuffs are dyed by the known methods, either with carrier at 80–100° C. or without carrier at 100–140° C. under pressure. Additions of dispersing agents can be beneficial. Printing and padding are best carried out in presence of suitable thickening agents, followed by fixation at high temperature with or without steam.

The dyestuffs used in the process are produced by the known methods by diazotization of 1-amino-2,4-dinitrobenzene and its derivatives, e.g. in nitrosylsulfuric acid, and coupling with an amine of the formula

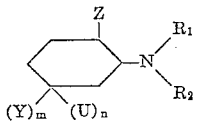

wherein U, Y, Z, $R_1$, $R_2$, $m$ and $n$ possess the aforecited meanings preferably in acid medium and to best advantage in presence of an acid-binding agent. The precipitated monoazo dyestuffs are filtered off and washed.

A second mode of operation for producing certain of these dyestuffs is to acylate by the known methods azo dyestuffs of the formula

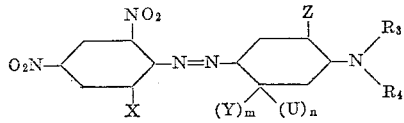

wherein
U, X, Y, Z, $m$ and $n$ possess the aforementioned meanings
$R_3$ denotes low molecular alkyl, low molecular alkoxyalkyl, low molecular hydroxyalkyl or, when $m$ is 0 and $n$ is 1, low molecular cyanoalkyl and
$R_4$ low molecular hydroxyalkyl,
with functional derivatives of aliphatic carboxylic acids, if necessary in presence of an acid-binding agent and/or a diluent which does not influence the reaction. It is often of advantage to increase the temperature. The monoazo dyestuffs thus obtained are isolated by one of the standard basic operations, e.g. filtration, evaporation of the solvent and filtration, distillation of solvent and filtration, precipitation from solvent with a suitable agent and filtration.

The further treatment of the monoazo dyestuffs to give dyestuff preparations can be carried out in several ways. For example, the dry dyestuff can be ground with a suitable dispersing agent, if desired in presence of fillers, or kneaded in paste form with a dispersing agent and subsequently dried with vacuum or in a nozzle drier.

The dyestuffs can be dyed, padded or printed in mixture with each other or with other suitable polyester dyestuffs.

In the following examples the parts and percentages are by weight and the temperatures in degrees centigrade.

*Example 1*

7 parts of 2.4-dinitro-6-bromo-2'-acetylamino-4'-bis-(acetoxy-ethyl)-amino-5'-ethoxy-1.1'-azobenzene (melting point 138°), 4 parts of sodium dinaphthylmethanedisulfonate, 4 parts of sodium cetylsulfate and 5 parts of anhydrous sodium sulfate are ground in a ball mill for 48 hours to give a fine powder.

1 part of this powder is pasted and dispersed with a little water and the suspension run through a sieve into a dyebath containing 0.5 g./l. lauryl alcohol sulfonate (liquor ratio 1:40). The liquor ratio may vary within wide limits. 100 parts of a scoured fabric of Dacron (registered trademark) polyester fiber are entered at 40–50°, the bath slowly heated to 95–100° and dyeing continued at this temperature for 1–2 hours in presence of 5 cc./l. of an aqueous emulsion of a chlorinated benzene. The fabric is subsequently rinsed, soaped, rinsed again and dried. It is dyed a greenish blue shade which is fast to light, cross dyeing, washing, water, sea water, perspiration, gas fumes, sublimation, heat setting and pleating, and is white dischargeable.

In place of 100 parts of Dacron, an equal weight of one of the polyester fibers Terital, Dralon, Trevira or Kodel can be dyed in the same way in greenish blue shade which possesses the same good fastness properties.

*Example 2*

10 parts of 2.4-dinitro-6-bromo-2'-propionylamino-4'-bis-(acetoxyethyl)-amino-1.1'-azobenzene (melting point 118–120°), 10 parts of sulfite cellulose waste powder and 80 parts of water are ground in the wet state in a ball mill for 48 hours and the resulting paste dried in a nozzle drier. A dyebath is prepared with 1 part of this dyestuff preparation and 1000 parts of water. 100 parts of a scoured fabric of Terylene (registered trademark) are entered at 40–50°, the dyebath heated slowly to 120–130° and dyeing continued for about 30 minutes at this temperature under pressure, with subsequent rinsing, soaping, rinsing and drying. The fabric is dyed a violet shade showing similar fastness properties to that of the dyestuff of Example 1.

*Example 3*

10 parts of 2.4-dinitro-6-bromo-2'-acetylamino-4'-bis-(acetoxy-ethyl)-amino-5'-methoxy-1.1'-azobenzene (melting point 123°) in the form of the moist undried filter press cake, 10 parts of Turkey red oil and sufficient water to give a total of 200 parts are mixed together to form a paste. After two hours a dyebath is set with 5 parts of this paste, 5 parts of 2-hydroxy-1.1'-diphenyl and 2000 parts of water. 100 parts of Tergal (registered trademark) polyester fiber are entered in the bath and dyed for 1 hour at the boil, rinsed and dried. A blue, well penetrated dyeing with excellent fastness properties is obtained.

*Example 4*

7 parts of 2.4-dinitro-6-bromo-2'-methyl-4'-(N-ethyl-N-acetoxyethyl)-amino-1.1'-azobenzene (melting point 134–136°), 38 parts of sodium dinaphthylmethanedisulfonate and 530 parts of water are ground in a ball mill for 48 hours. The colloidal solution formed is mixed with 25 parts of butylcarbitol and 400 parts of 6% carboxymethylcellulose. This printing paste is highly suitable for vigoureux or melange printing on slubbing of polyester fiber, e.g., Diolen (registered trademark). It is applied from two rollers at a coverage of 78% and the slubbing is steamed at 115–120° without intermediate drying. Brownish red prints of very good fastness are obtained.

*Example 5*

A finely dispersed aqueous suspension of 17 parts of 2.4-dinitro-6-bromo - 2'-methyl - 4' - (N - cyanoethyl - N-ethyl)-amino-1.1'-azobenzene (melting point 188–190°), 48 parts of sodium dinaphthylmethanedisulfonate and 25 parts of butyl carbitol in 50 parts of water is mixed with 500 parts of crystal gum 1:2, 30 parts of glycerine and 320 parts of water. The paste formed is printed on a fabric of polyester fiber, steamed at 7 to 10 lb. per sq. in. pressure to develop the shade, and then rinsed, soaped and dried. A sharp-edged red print with outstanding fastness properties is obtained. Similar effects are obtained when the dyestuff used in this example is dyed as described in Example 2 and the dyeing discharged according to the method given in SVF-Fachorgan 11, 620–621 (1956).

*Example 6*

A finely dispersed aqueous suspension of 15 parts of 2.4-dinitro - 2'-propionylamino - 4' - bis - (acetoxyethyl)-amino-1.1'-azobenzene (melting point 160°), 35 parts of sodium dinaphthylmethanedisulfonate and 2 parts of alginate is mixed with 1000 parts of water. A polyester fiber fabric is padded with this liquor by the normal procedure at a temperature between 20 and 70°, air-dried at 60–100°, fixed by 30–90 seconds treatment in dry air at 180–220°, rinsed and soaped. A level, bluish red dyeing with good fastness properties is obtained.

In the following table further dyestuffs suitable for dyeing, padding and printing polyester fibers by the processed described herein are listed; they are characterized by their melting points and their shades on Dacron polyester fiber.

| Example No. | X | Y | U | Z | R₁ | R₂ | Melting Point, deg. | Shade on Polyester Fiber |
|---|---|---|---|---|---|---|---|---|
| 7 | H | —NH—CO—CH₃ | | —OC₂H₅ | acetoxyethyl | acetoxyethyl | 167 | greenish blue. |
| 8 | H | —NH—CO—CH₃ | | —OCH₃ | do | do | 160 | Do. |
| 9 | CL | —NH—CO—C₂H₅ | | H | do | do | 100 | violet. |
| 10 | CL | —NH—CO—CH₃ | | —OCH₃ | do | do | 136 | greenish blue. |
| 11 | CL | —NH—CO—CH₃ | | —OC₂H₅ | do | do | 153 | Do. |
| 12 | CN | —NH—CO—C₂H₅ | | H | do | do | 159 | Do. |
| 13 | CN | | | H | do | cyanoethyl | 166 | bluish red. |
| 14 | CN | | | H | ethyl | do | 180 | violet. |
| 15 | CN | | —CH₃ | H | do | do | 179 | reddish blue. |
| 16 | CN | CH₃ | | H | do | acetoxyethyl | 102 | blue. |

Example 17

64 parts of a dyeing preparation prepared as described in the first paragraph of Example 1, 22 parts of a corresponding dyeing preparation from the dyestuff 2-chloro-4-nitro-4'-(N-acetoxyethyl-N - cyanoethyl) - amino - 1.1'-azobenzene and 14 parts of a corresponding dyeing preparation from the dyestuff 2.6-dichloro-4-nitro-4'-(N-acetoxyethyl-N-cyanoethyl)-amino-1.1'-azobenzene are intimately mixed. 8.7 parts of the mixture are pasted with a little water, and the suspension formed is added through a sieve to a dyebath containing 0.5 gram per liter of lauryl alcohol sulfate (liquor ratio 1:40). The liquor ratio may vary within wide limits. 100 parts of a scoured fabric of Dacron polyester fiber are entered at 40–50°, the bath heated slowly and dyeing continued for 1–2 hours at 95–100° in presence of 5 cc. per liter of an emulsion of a chlorinated benzene in water.

The full black dyeing obtained is rinsed, soaped, rinsed and dried. It is fast to light, cross dyeing, washing, water, sea water, perspiration, gas fumes, sublimation, heat-setting and pleating, and is white dischargeable.

Example 18

3.6 parts of a dyeing preparation prepared according to Example 2 from the dyestuff 2.4-dinitro-6-chloro-2' - propionylamino - 4' - bis - (acetoxyethyl) - amino - 5'-methoxy-1.1'-azobenzene and 0.4 part of a dyeing preparation also prepared according to Example 2 from the dyestuff 2-chloro-4-nitro-4'-(N-acetoxyethyl-N - cyanoethyl)-amino-1.1'-azobenzene, are added to 1000 parts of water. 100 parts of a scoured fabric of Terylene polyester fiber are entered in this dyebath at 40–50°, the temperature slowly increased and dyeing continued for 30 minutes at 120–130° under static pressure. The fabric is subsequently rinsed, soaped, rinsed and dried. It is dyed a greenish navy blue shade which has similar fastness properties to the dyeing produced with the stable dyeing preparation of Example 17.

When 4 parts of a dyeing preparation prepared according to Example 2 from the dyestuff 2.4-dinitro-6-bromo-2'-acetyl-amino - 4'-bis - (acetoxyethyl) - amino - 5' - methoxy-1.1'-azobenzene and 0.4 part of one also produced according to Example 2 from the dyestuff 2-cyano-4-nitro-4'-(N-acetoxyethyl - N - cyanoethyl) - amino-1.1'-azobenzene are used, reddish navy blue dyeings are obtained.

Example 19

A dyebath is prepared on the winch with 3.7 parts of a finely dispersed preparation of 27 parts of the dyestuff 2.4-dinitro-6-bromo-2'-acetylamino - 4'-bis-(acetoxyethyl)-amino-5'-ethoxy-1.1'-azobenzene, 3 parts of the dyestuff 2-cyano-4-nitro-4'-(N-ethyl - N - cyanoethyl)-amino-1.1'-azobenzene and 70 parts of sodium dinaphthylmethanesulfonate, mixed in the usual manner with 20 parts of a stable emulsion of 2-hydroxy-1.1'-diphenyl, e.g. as marketed under the name "Carolid," in 10,000 parts of water. 200 parts of a blended fabric of 55% "Dacron" and 45% wool are dyed in this bath for 1½ hours at 95–98°. The "Dacron" is dyed in a reddish navy blue shade fast to light, cross dyeing, washing, water, sea water, perspiration, gas fumes, sublimation, heat-setting and pleating, while the wool component after intermediate clearing with hydrosulfite is unstained and can be dyed with suitable dyestuffs, e.g. premetallized dyestuffs. The excess 2-hydroxy-1.1'-diphenyl is removed from the goods by washing or heat treatment.

In the following table are listed further dyestuff mixtures consisting of dyestuffs of Formulas II and III. The symbols X, Z, R₁, R₂, R₃ and W have the meanings assigned to them in the introduction. The parts by weight of the two dyestuffs used for each mixture are given in separate columns, and in the last column the shade of the mixture on polyester fiber is noted.

| Example of mixture | Dyestuff of formula (II) | | | | | | Dyestuff of formula (III) V=H | | | | Shade of dyeing or print on polyester fiber |
|---|---|---|---|---|---|---|---|---|---|---|---|
| | Parts | X | Z | R₁ | R₂ | R₃ | Parts | R₁ | R₄ | W | |
| 20 | 95 | CN | H | methyl | acetoxyethyl | methyl | 5 | methyl | chloro | bromo | navy blue. |
| 21 | 55 | H | OCH₃ | ethyl | acetoxypropyl | do | 45 | butyl | methyl | CN | Do. |
| 22 | 80 | NO₂ | H | acetoxyethyl | acetoxyethyl | ethyl | 20 | propyl | ethyl | CN | Do. |
| 23 | 75 | chloro | OCH₃ | butyl | do | methyl | 25 | butyl | methyl | CN | Do. |
| 24 | 95 | bromo | OC₂H₅ | methoxyethyl | do | do | 5 | acetoxyethyl | H | CF₃ | Do. |
| 25 | 80 | CF₃ | OC₂H₅ | methoxypropyl | acetoxypropyl | do | 20 | acetoxypropyl | H | CF₃ | Do. |
| 26 | 90 | chloro | OCH₃ | ethoxyethyl | acetoxyethyl | do | 10 | acetoxyethyl | H | Cl | Do. |
| 27 | 85 | bromo | OC₂H₅ | propionyloxyethyl | propionyloxyethyl | do | 15 | ethyl | H | Cl | Do. |
| 28 | 90 | CF₃ | OCH₃ | acetoxyethyl | acetoxyethyl | do | 10 | propionyloxyethyl | H | Cl | Do. |
| 29 | 75 | chloro | OCH₃ | propyl | do | propyl | 25 | methoxyethyl | methyl | CN | Do. |
| 30 | 90 | CF₃ | OC₂H₅ | ethyl | acetoxybutyl | methyl | 10 | acetoxybutyl | H | bromo | Do. |
| 31 | 60 | chloro | OCH₃ | acetoxyethyl | acetoxyethyl | do | 10 | acetoxyethyl | H | Cl | Do. |
| | 30 | bromo | OC₂H₅ | do | do | do | | | | | |
| 32 | 20 | chloro | OCH₃ | do | do | do | 25 | do | H | bromo | black. |
| | 20 | bromo | OC₂H₅ | do | do | ethyl | 10 | methyl | H | V=W =bromo | |
| | 25 | do | OC₂H₅ | do | do | methyl | | | | | |

Having thus disclosed the invention, what we claim is:
1. Process for coloring linear polyester fibers comprising dyeing said fibers with dyestuff of the formula

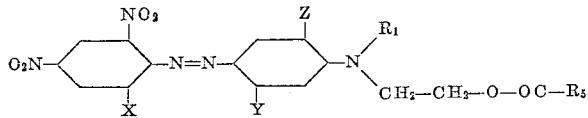

wherein
- $R_1$ is a member selected from the group consisting of (lower)alkyl and (lower)acyloxyalkyl,
- $R_5$ is (lower)alkyl,
- X is a member selected from the group consisting of chlorine and bromine,
- Z is a member selected from the group consisting of hydrogen and (lower)alkoxy, and
- Y is a member selected from the group consisting of (lower)alkyl and (lower)acylamino.

2. A process for coloring linear polyester fibers comprising padding said fibers with a dyestuff as defined in claim 1.

3. A process for coloring linear polyester fibers comprising printing said fibers with a dyestuff as defined in claim 1.

4. Polyester fibers colored with a dyestuff of the formula as defined in claim 1.

5. Composition of matter consisting essentially of 55 to 95 parts of dyestuff of the formula

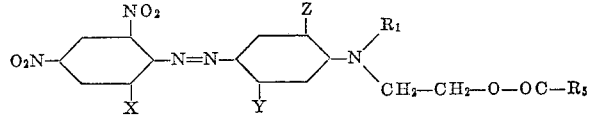

wherein
- $R_1$ is a member selected from the group consisting of (lower)alkyl and (lower)acyloxyalkyl,
- $R_5$ is (lower)alkyl,
- X is a member selected from the group consisting of chlorine and bromine,
- Z is a member selected from the group consisting of hydrogen and (lower)alkoxy, and
- Y is a member selected from the group consisting of (lower)alkyl and (lower)acylamino and 45 to 5 parts of dyestuff of the formula

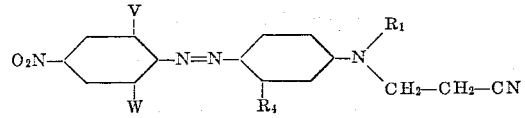

wherein
- V is a member selected from the group consisting of hydrogen, chlorine and bromine,
- W is a member selected from the group consisting of chlorine, bromine, cyano and trifluoromethyl,
- $R_4$ is a member selected from the group consisting of hydrogen, methyl, ethyl and chlorine, and
- $R_1$ is a member selected from the group consisting of (lower)alkyl, (lower)alkoxyalkyl and (lower)acyloxyalkyl, with at least one anionic dispersing agent and at least one standardizing agent.

6. Polyester fibers colored with a dyestuff mixture of claim 5.

References Cited in the file of this patent
UNITED STATES PATENTS

| | | |
|---|---|---|
| 2,173,417 | Huber | Sept. 19, 1939 |
| 2,312,398 | Felix | Mar. 2, 1943 |
| 2,638,403 | Stead et al. | May 12, 1953 |
| 2,726,237 | Towne et al. | Dec. 6, 1955 |
| 2,782,187 | Sartori | Feb. 19, 1957 |
| 2,888,450 | Kruckenberg | May 26, 1959 |
| 3,042,478 | Merian et al. | July 3, 1962 |
| 3,050,516 | Merian et al. | Aug. 21, 1962 |